US008863104B2

(12) United States Patent
Pingali et al.

(10) Patent No.: US 8,863,104 B2
(45) Date of Patent: Oct. 14, 2014

(54) PROGRAMMING MODEL AND SOFTWARE SYSTEM FOR EXPLOITING PARALLELISM IN IRREGULAR PROGRAMS

(75) Inventors: Keshav Kumar Pingali, Austin, TX (US); Milind Vidyadhar Kulkarni, Austin, TX (US)

(73) Assignee: Board of Regents, The University of Texas System, Austin, TX (US)

(*) Notice: Subject to any disclaimer, the term of this patent is extended or adjusted under 35 U.S.C. 154(b) by 1286 days.

(21) Appl. No.: 12/482,118

(22) Filed: Jun. 10, 2009

(65) Prior Publication Data

US 2009/0307655 A1 Dec. 10, 2009

Related U.S. Application Data

(60) Provisional application No. 61/060,186, filed on Jun. 10, 2008.

(51) Int. Cl.
*G06F 9/44* (2006.01)
*G06F 9/45* (2006.01)

(52) U.S. Cl.
CPC ...... *G06F 8/456* (2013.01); *G06F 8/45* (2013.01); *G06F 9/44* (2013.01)
USPC ............................ 717/149; 717/140; 717/106

(58) Field of Classification Search
CPC .......... G06F 8/452; G06F 9/44; G06F 8/4452
USPC ................................................. 717/106, 149
See application file for complete search history.

(56) References Cited

U.S. PATENT DOCUMENTS

| | | | | |
|---|---|---|---|---|
| 6,243,863 | B1 * | 6/2001 | Kothari et al. | 717/149 |
| 6,622,301 | B1 * | 9/2003 | Hirooka et al. | 717/149 |
| 8,341,615 | B2 * | 12/2012 | Eichenberger et al. | 717/161 |
| 8,448,155 | B2 * | 5/2013 | Bordelon et al. | 717/149 |
| 2002/0085007 | A1 | 7/2002 | Nelson et al. | 345/505 |

OTHER PUBLICATIONS

"Martin C. Rinard";"Commutativity Analysis: A New Analysis Technique for Parallelizing Compilers"; "Nov. 1997"; "ACM vol. 19 No. 6"; "50 Pages".*
"Christos D. Antonopoulos, Xiaoning Ding, Andrey Chernikov, Filip Blagojevic, Dimitrios S. Nikolopoulos, and Nikos Chrisochoides";"Multigrain Parallel Delaunay Mesh Generation: Challenges and Opportunities for Multithreaded Architectures";"Jun. 2005" ;"ACM 1-59593-167-8";"10 Pages".*
"Yang Ni Vijay Menon Ali-Reza Adl-Tabatabai Antony L. Hoskingl Richard L. Hudson J. Eliot B. Moss2 Bratin Saha Tatiana Shpeisman";"Open Nesting in Software Transactional Memory";"Marsh 2007";"ACM 978-1-59593-602-8/07/0003";"11 Pages".*
"Milind Kulkarni, Keshav Pingali,Bruce Walter, Ganesh Ramanarayanan, Kavita Bala , L. Paul Chew";"Optimistic Parallelism Requires Abstractions";"Jun. 2007";"2007 ACM 978-1-59593-633-2/07/0006";"12 Pages".*

(Continued)

*Primary Examiner* — Anna Deng
*Assistant Examiner* — Brahim Bourzik
(74) *Attorney, Agent, or Firm* — Ballard Spahr LLP

(57) ABSTRACT

Systems and methods for parallelizing applications that operate on irregular data structures. In an embodiment, the methods and systems enable programmers to use set iterators to express algorithms containing amorphous data parallelism. Parallelization can be achieved by speculatively executing multiple iterations of the iterator in parallel. Conflicts between speculatively executing iterations can be detected and handled using information in class libraries.

14 Claims, 12 Drawing Sheets

(56) References Cited

OTHER PUBLICATIONS

"Benoît Hudson Gary L. Miller Todd Phillips";"Sparse Parallel Delaunay Mesh Refinement";"Jun. 2007";"9 pages".*
"Milind Kulkarni and Keshav Pingali";"Scheduling Issues in Optimistic Parallelization";"Mar. 26-30, 2007";"7pages".*
"Charles et al"; "Parallelization of structured, hierarchical adaptive mesh refinement algorithms";"Nov. 25, 1999"; 11 pages.*
Blelloch, G. E. et al., "Implementation of a portable nested data-parallel language," Proceedings of the fourth ACM SIGPLAN Symposium on Principles and Practice of Parallel Programming, May 19-22, 1993, pp. 102-111. See abstract, pp. 102-103.
Gilbert, J. R. et al. "High-performance graph algorithms from parallel sparse matrices." Lecture Notes in Computer Science, SpringerLink Date Sep. 23, 2007, pp. 260-269. See abstract, pp. 260-262.
Kulkarni, M.and Pingali, K. "Optimistic Parallelism Requires Abstractions." PLDI'07 Jun. 11-13, 2007, San Diego, CA USA.
Kulkarni, M.and Pingali, K. "Optimistic Parallelism Benefits from Data Partitioning." ASPLOS'08 Mar. 1-5, 2008, Seattle, WA, USA.

* cited by examiner

FIG. 2

For each e in Set S do B(e)

FIG. 3

For each e in Poset S do B(e)

FIG. 4

```
1:   Mesh m = /* read in initial mesh */
2:   Set wl;
3:   wl.add(mesh.badTriangles());
4:   for each e in wl do {
5:       if (e no longer in mesh) continue;
6:       Cavity c = new Cavity(e);
7:       c.expand();
8:       c.retriangulate();
9:       m.update(c);
10:      wl.add(c.badTriangles());
11:  }
```

FIG. 5

```
Class Set {
      void add(Object x);
      void remove(Object x);
      boolean contains(Object x);
}
```

FIG. 7

```
void add(Object x);
[commutes]
        add(Object y) : {y != x}
        remove(Object y)  {y != x}
      contains(Object y) : {y!= x}
[undo]
        {remove(x) } void remove(Object x);
[commutes]
        add(Object y) : {y != x}
        remove(Object y)  {y != x}
      contains(Object y) : {y!= x}
[undo]
        {add(x) } boolean contains(Object x);
[commutes]
        add(Object y) " {y != x}
        remove(Object y) : {y != x}
        contains(Object y) : {true}
```

FIG. 8

```
IterationRecord {
        Status      status;
        Priority p;
        UndoLog ul;
        list<LocalConflicLog> local_log;
        Lock l;
}
```

PROGRAMMING MODEL AND SOFTWARE SYSTEM FOR EXPLOITING PARALLELISM IN IRREGULAR PROGRAMS

CROSS REFERENCE TO RELATED PATENT APPLICATION

This application claims priority to U.S. Provisional Application No. 61/060,186 filed Jun. 10, 2008, herein incorporated by reference in its entirety.

GOVERNMENT SUPPORT CLAUSE

This invention was made with government support under Grant 0702353 awarded by the National Science Foundation. The government has certain rights in the invention.

SUMMARY

Provided are systems and methods for parallelizing applications that operate on irregular data structures. In an embodiment, the methods and systems enable programmers to use set iterators to express algorithms containing amorphous data parallelism. Parallelization can be achieved by speculatively executing multiple iterations of the iterator in parallel. Conflicts between speculatively executing iterations can be detected and handled using information in class libraries.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2 illustrates a simplified, non-limiting example of a set iterator;

FIG. 3 illustrates a simplified, non-limiting example of an ordered set-iterator.

FIG. 4 illustrates a simplified, non-limiting example of a Delaunay mesh refinement code using set iterators;

FIG. 5 illustrates a simplified, non-limiting example of a Set class;

FIG. 7 illustrates a simplified, non-limiting example of specifications for a Set;

FIG. 8 illustrates a simplified, non-limiting example of an iteration record maintained by a runtime system;

DETAILED DESCRIPTION

Figure 1:
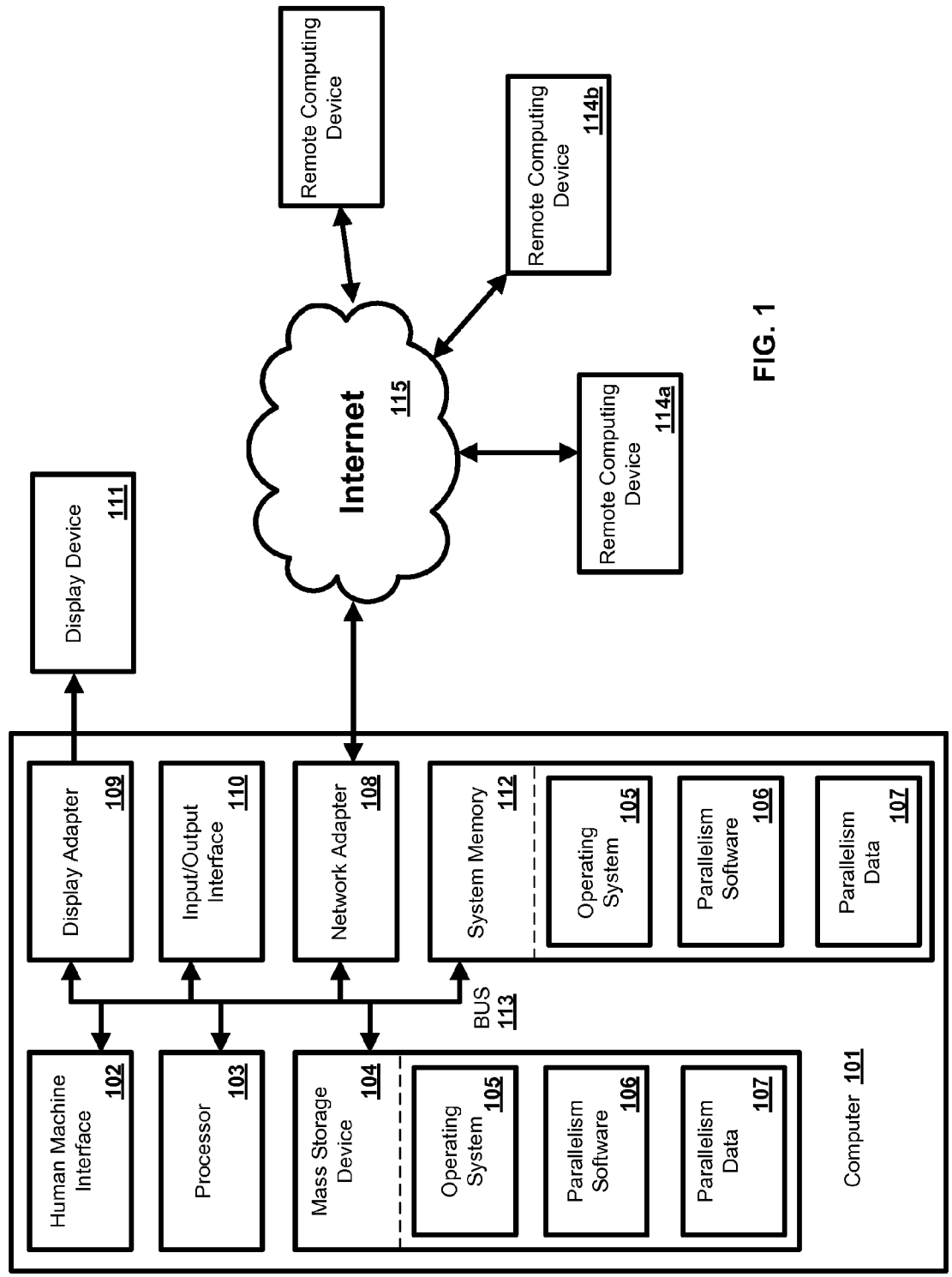
FIG. 1 illustrates a simplified, non-limiting block diagram showing select components of a system according to one embodiment.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus also known as a Mezzanine bus. The bus 113, and all buses specified in this description can also be implemented over a wired or wireless network connection and each of the subsystems, including the processor 103, a mass storage device 104, an operating system 105, Parallelism software 106, Parallelism data 107, a network adapter 108, system memory 112, an Input/Output Interface 116, a display adapter 109, a display device 111, and a human machine interface 102, can be contained within one or more remote computing devices 114$a,b,c$ at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as Parallelism data 107 and/or program modules such as operating system 105 and Parallelism software 106 that are immediately accessible to and/or are presently operated on by the processing unit 103.

In another aspect, the computer 101 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and Parallelism software 106. Each of the operating system 105 and Parallelism software 106 (or some combination thereof) can comprise elements of the programming and the Parallelism software 106. Parallelism data 107 can also be stored on the mass storage device 104.

Parallelism data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 116. Any step and/or result of the methods can be output in any form to an output device. Such output can be any form of visual representation, including, but not limited to, textual, graphical, animation, audio, tactile, and the like.

The computer 101 can operate in a networked environment using logical connections to one or more remote computing devices 114a,b,c. By way of example, a remote computing device can be a personal computer, portable computer, a server, a router, a network computer, a peer device or other common network node, and so on. Logical connections between the computer 101 and a remote computing device 114a,b,c can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 117.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of Parallelism software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As used herein, "amorphous data-parallelism" is a form of parallelism that manifests itself in programs that iterate over work-sets which may be ordered or unordered and may get additional elements during the iteration. The work in different iterations may have complex dependences that prevent all of them from being executed in parallel simultaneously, but subsets of these iterations may nevertheless be independent and therefore can be executed in parallel.

In an aspect, provided is an object-based parallelization system for exploiting amorphous data-parallelism. In one embodiment, the methods and system can be defined by three aspects: (1) a number of syntactic constructs for packaging amorphous data-parallelism as iteration over ordered and unordered work-sets, (2) assertions about methods in class libraries, and (3) a runtime scheme for managing the exploitation of amorphous data-parallelism.

In one embodiment, the methods and systems can comprise one or more of the user code, class libraries with assertions about method properties, and a run time system for managing the exploitation of amorphous data-parallelism, each part representing different aspects of the parallelization process.

In an embodiment, the user code can be code written by programmers who understand the algorithm they are writing, but may not be expert parallel programmers. Simple constructs can be used for expressing amorphous data-parallelism, but do not specify any parallelization or synchronization.

In another embodiment, assertions about methods in class libraries can expose certain data structure semantics related to method atomicity, commutativity and inverses. This information can be used by a runtime system to more effectively parallelize user code.

In yet another embodiment, the runtime system can be responsible for the parallelization of user code by speculatively executing computational work in parallel.

In an embodiment, user code is not explicitly parallel; instead parallelism can be packaged into a plurality of constructs referred to herein as "optimistic iterators." Do-all loops can be distinguished from do-across loops. The iterations of a do-all loop can be executed in any order because the compiler or the programmer asserts that there are no dependences between iterations. In contrast, a do-across loop can be one in which there may be dependences between iterations, so proper sequencing of iterations is necessary. In an embodiment, two analogous constructs for packaging amorphous data-parallelism can be "unordered-set iterators," and "ordered-set iterators."

Figure 2:
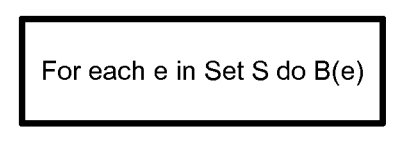

FIG. 2 illustrates a simplified non-limiting example of an unordered-set iterator. In an embodiment, a loop body B(e) can be executed for each element e of set S. Since set elements are not ordered, this construct asserts that in a serial execution of the loop, the iterations can be executed in any order. There can be dependences between the iterations but any serial order of executing iterations can be permitted. When an iteration executes, it can add elements to S.

FIG. 3 illustrates a simplified non-limiting example of an ordered-set iterator. This construct can be an iterator over a partially-ordered set (Poset) S. The ordered-set iterator can assert that, in a serial execution of the loop, the iterations can be performed in the order specified by the ordering of elements in the Poset S. There can be data dependences between iterations, and as in the case of the unordered-set iterator, elements can be added to S during execution.

FIG. 4 illustrates a simplified non-limiting example of user code for a Delaunay mesh refinement algorithm, illustrating the use of an unordered-set iterator. Instead of a work list of bad triangles, this code uses a set of bad triangles and an unordered-set iterator. In an embodiment of the methods, the bad triangles in a Delaunay mesh can be processed in any order. Furthermore, the program illustrated in FIG. 4 can be viewed as a sequential program. The semantics can be understood without appealing to a parallel execution model.

In one embodiment, though the semantics of the optimistic iterators can be specified without appealing to a parallel execution model, these iterators can still provide hints from the programmer to the runtime system that it can be profitable to execute the iterations in parallel. In an embodiment, parallel execution can be faithful to the sequential semantics.

In an embodiment, the concurrent execution model can comprise a master thread, which can begin the execution of the program and execute the code outside the optimistic iterators. When the master thread encounters an optimistic iterator, it can enlist the assistance of one or more worker threads to execute iterations from the set or Poset concurrently with itself. The assignment of iterations to threads can be under the control of a scheduling policy implemented by the runtime system. In another embodiment, the assignment can be performed dynamically to ensure load-balancing. Furthermore, the threads can be synchronized using barrier synchronization at the end of the iterator.

In an embodiment, the system can use an object-based, shared memory model. The system can rely on cache coherence to communicate shared data between processors. The shared data can be encapsulated in objects, and reading or writing shared data can be performed by invoking methods on those objects.

Execution Model

In an embodiment, the concurrent execution model can comprise a master thread, which can begin the execution of the program and execute the code outside the optimistic iterators. When the master thread encounters an iterator, it can enlist the assistance of one or more worker threads to execute iterations concurrently with itself. The assignment of iterations to threads can be under the control of a scheduling policy implemented by a runtime system. In another embodiment, the assignment can be performed dynamically to ensure load-balancing. Furthermore, the threads can be synchronized using barrier synchronization at the end of the iterator.

In one embodiment, nested iterators can be executed in parallel. In another embodiment, nested iterators are not supported because a thread encountering an inner iterator can execute the entire inner iterator sequentially.

In an embodiment, libraries can comprise classes comprising key semantic properties of data structures being defined. FIG. 5 illustrates a non-limiting example of one set class in a plurality of set classes.

In one embodiment, classes can be atomic. If methods are invoked concurrently on an object by many threads, each thread can correctly perform its operation as if no other threads were accessing the object. Atomicity can be achieved, for example, by acquiring a lock on an object before invoking any method, and releasing that lock when the method is complete. Other methods known to those skilled in the art can be used for achieving atomicity.

In one embodiment, the runtime system can provide that a plurality of iterations of the optimistic iterator executing in parallel do not violate sequential semantics of the user code in the following way: if all the methods invoked by one iteration commute with all the methods invoked by a concurrently executing iteration, then the two iterations can proceed safely in parallel.

Figures 6A, 6B:
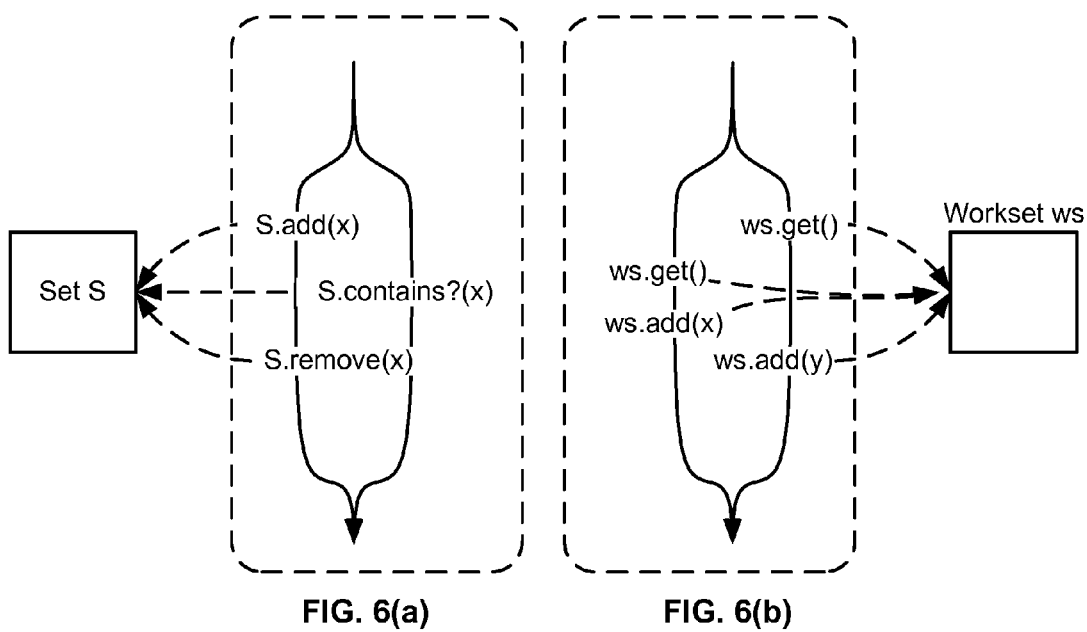
FIGS. 6(*a*) and 6(*b*) illustrate a simplified, non-limiting example of an interleaving method invocations from two different iterations.

In an embodiment, the method invocations to a given object from two iterations can be interleaved while preserving sequential semantics, provided that these method invocations commute. In FIG. 6(a), the invocation contains? (x) does not commute with the operations from the other iteration, so the invocations from the two iterations cannot be interleaved. In FIG. 6(b), get operations commute with each other, and a get operation commutes with an add operation provided that the operand of add is not the element returned by get. Thus, multiple threads can execute work from a work-set while maintaining the sequential semantics of iterators.

In another embodiment, the commutativity conditions can be semantic—the conditions can be concerned with the semantics of the abstract data type the class represents, not the implementation of the class. Thus, regardless of how the set is implemented (for example, a linked-list, a hash table, a red-black tree, to name a few set implementations in a plurality of implementations), the commutativity conditions remain the same.

In one embodiment, the internal state of the object can be different for different orders of method invocations even if these invocations commute in the semantic sense. For example, if the set is implemented using a linked list and two elements are added to this set, the concrete state of the linked list will depend in general on the order in which these elements were added to the list. In one embodiment, the state of the set abstract data type can be the same for both orders.

To track information regarding method commutativity, the classes can specify commutativity properties for the methods they define. Thus, each method can specify which other methods it commutes with, and under what conditions. Turning to the set example of FIG. 5, "add" commutes with "remove" as long as the arguments are different; "contains" commutes with "add" as long as the arguments are different and so forth. This commutativity information is summarized in FIG. 7 which illustrates a simplified non-limiting example of specification for a set. A listing can be provided after each method, indicating the other methods it commutes with. For each listing, there can be a side predicate involving the arguments to both methods. The two methods commute whenever the side predicate evaluates to true (so, for example, since "contains" commutes with any other invocation of "contains", the side predicate is simply true).

In an embodiment, because iterations can be executed in parallel, it is possible for commutativity conflicts to prevent an iteration from completing. Once a conflict is detected, a recovery mechanism can be invoked to allow execution of the program to continue despite the conflict. Because the execution model can use the paradigm of optimistic parallelism, the recovery mechanism can roll back the execution of the conflicting iteration. To permit this, every method of a shared object that may modify the state of that object can be associated with an inverse method that undoes the effects of that method invocation. For example, for a set which does not contain x, the inverse of add(x) is remove(x), and the inverse of remove(x) is add(x). In one embodiment, information concerning inverse methods can be expressed in the same class specification as the commutativity information, under the "undo" heading, as seen in FIG. 7.

In an embodiment, the undo methods can be semantic. Rather than restoring the concrete state of an object when performing an undo, the semantic effects of the method can be reversed. As in the case of semantic commutativity, invoking a method and its inverse in succession may not restore the concrete data structure to what it was.

The runtime system can parallelize code comprising optimistic iterators. The runtime system can use information from library classes to determine when parallel execution can be performed, and how to recover from incorrect execution. In an aspect, the runtime system can be described by global structures. For example, a "scheduler" for creating iterations, an "arbitrator" for aborting iterations, a "commit pool" for committing iterations and the like. The runtime system can also interact with "per-object conflict logs" which are responsible for detecting commutativity violations.

FIG. 8 illustrates a simplified non-limiting example of an iteration record maintained by a commit pool for each ongoing iteration in the system. In this example, the status of an iteration can be RUNNING, RTC (ready-to-commit) or ABORTED. Threads go to a scheduler to obtain an iteration. The scheduler can create a new iteration record, obtain the next element from the iterator, assign a priority to the iteration record based on the priority of the element (for an unordered-set iterator, all elements have the same priority), create an entry for the iteration in the commit pool, and set the status field of the iteration record to RUNNING. When an iteration invokes a method of a shared object, the conflict log of that object and the local log of the iteration record can be updated, and a callback to the associated undo method can be pushed onto the undo log of the iteration record. When a commutativity conflict is detected, the arbitrator can arbitrate between conflicting iterations, and abort iterations to permit the highest priority iteration to continue execution. Callbacks in the undo logs of aborted iterations can be executed to undo effects on shared objects. When a thread has completed an iteration, the status field of that iteration can be changed to RTC, and the thread can be allowed to begin a new iteration. When the completed iteration has the highest priority in the system, it can be allowed to commit.

A component of the runtime system can be a scheduler. The scheduler can assign work to threads as needed. In one embodiment of the system, the scheduler can assign work randomly from the unordered-set iterator to threads. In other embodiments of the system, the scheduler can assign work based on scheduling policies that improve performance. In this case, the scheduler can be replaced with a different implementation more appropriate to the application.

Figure 9:
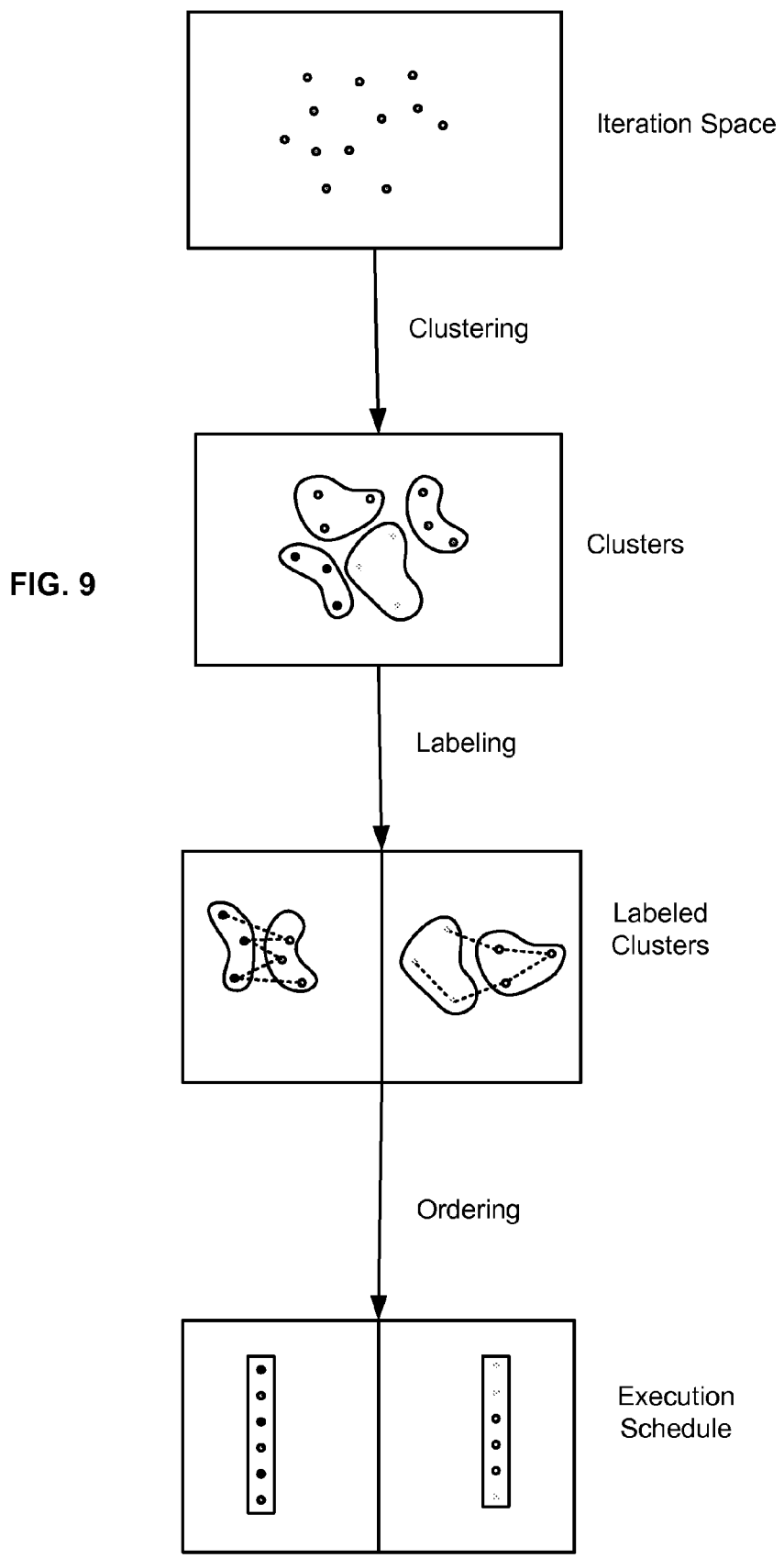
FIG. 9 illustrates a simplified, non-limiting graphical example of a scheduling framework.

The defined schedule for the iterations of an optimistic iterator can comprise specifications for scheduling functions. FIG. 9 illustrates a simplified non-limiting example of three functions. A clustering function can map each iteration to a cluster or group of iterations, all of which can be executed by a single thread. A labeling function can assign each cluster of iterations to a thread. A single thread can execute iterations from several clusters. An ordering function can map the iterations in the different clusters assigned to a given thread to a linear order that defines the execution order of the iterations.

To understand scheduling functions, it can be useful to consider how the static and dynamic scheduling schemes supported by OpenMP map to this framework. For a OpenMP static schedule with chunk size c, the clustering function can partition the iterations of the DO-ALL loop into clusters of c contiguous iterations. The labeling function can assign these clusters to threads in a round-robin fashion, with each thread being assigned a cluster in turn, so each thread can end up with several clusters. In one embodiment, the ordering function can be described as cluster-major order since a thread can execute clusters in lexicographic order, and the thread can execute all iterations in a cluster before it can execute iterations from the next cluster. For static schedules of DO-ALL loops, the iteration space, clusters and the scheduling functions can be known before the loop can begin execution. For OpenMP dynamic schedules, some of the scheduling, labeling or clustering functions can be defined incrementally as the loop executes. Consider a dynamic schedule with chunk size c. As in the case of static schedules, a clustering function can partition iterations into clusters of c contiguous iterations, and the clustering function can be defined completely before the loop begins execution. However, a labeling function can be defined incrementally during loop execution since the assignment of clusters to threads can be performed on demand. An ordering function can be cluster-major order, as in the static case. FIG. 9 can be viewed as a post-execution report of scheduling decisions, some of which may be made before loop execution, while the rest can be made during loop execution.

Scheduling in programs exhibiting amorphous data parallelism can be viewed as a generalization of the OpenMP case in which even the iteration space and clusters can be defined dynamically. In applications like Delaunay mesh refinement, elements can be added to the work-set as the optimistic iterator executes, and this can correspond abstractly to the addition of new points to the iteration space of the iterator during execution. In one embodiment, the method and system can distinguish between the initial iterations of the iteration space, which exist before iterator execution begins, and dynamically created iterations, which can be added to the iteration space as the iterator executes. The initial iterations can be clustered before iterator execution begins, but the scheduler can decide to create new clusters for dynamically created iterations, so both the iteration space and clusters can be defined dynamically.

In an aspect, a clustering/labeling/ordering policy can be a systematic procedure for generating a category of clustering/labeling/ordering functions. For example, a random clustering policy can assign iterations to clusters randomly, and can produce different assignments of iterations to clusters (i.e., different clustering functions) in different runs.

In an embodiment, one or more of the following policies for assigning initial iterations to clusters can be implemented:

Chunking: This policy can be defined for ordered-set iterators, and it can be a generalization of OpenMP-style chunking of DO-ALL loops. A chunk size c can be specified, and the policy clusters c contiguous iterations at a time;

Data-centric: In some applications, there can be an underlying global data structure that can be accessed by all iterations. Partitioning this data structure between the threads can lead to a natural clustering of iterations; for example, if the mesh in Delaunay mesh refinement is partitioned between the threads, the responsibility for refining a bad triangle can be given to whichever thread owns the partition that contains that bad triangle. The data-centric policy can be similar to High Performance FORTRAN (HPF). The number of data partitions can be specified or can be determined heuristically by the system;

Random: In some applications, it can be desirable to assign initial iterations to clusters randomly. The number of initial clusters can be specified or can be chosen heuristically;

Unit: Each iteration can be in a cluster by itself. This can be considered to be a degenerate case of random clustering in which each cluster contains exactly one iteration.

In one embodiment, for applications that dynamically create new iterations, the policy for a new iteration can be chosen separately from the decision made for the initial iterations. Dynamically created iterations can be clustered using the Data-centric, Random, and Unit policies described above. For example, one policy specifically for dynamically created iterations can be an inherited policy. In this policy example, if the execution of iteration i1 creates iteration i2, i2 can be assigned to the same cluster as i1. This particular policy lends itself to efficient implementation using thread-local work-sets. Newly created iterations can be added to the thread-local work-set, which can be accessed without synchronization.

An aborted iteration can be treated as a dynamically created iteration. For example, if a schedule uses the inherited clustering policy, an aborted iteration can be assigned to the same cluster it was in previously, but if it uses the random policy, an aborted iteration can be assigned to a random cluster.

In an aspect, labeling policies can be static or dynamic. In static labeling, every cluster can be assigned to a thread before execution begins. In dynamic labeling, clusters can be assigned to threads on demand. Static labeling policies can be a round-robin assignment for ordered-set iterators. If clustering is performed using a data-centric policy, the cluster can be assigned to the same thread that owns the corresponding data partition. This promotes locality and also reduces the likelihood of conflicts because threads work on disjoint data for the most part. Clusters can be assigned randomly to threads. In another aspect, LIFO/FIFO policies can be implemented. These policies can be used when clusters are created dynamically. For example, LIFO labeling means when a thread needs work it can be given the most recently created cluster.

In an embodiment, from a correctness perspective, the choice of which iteration to roll back when iterating over conflicting unordered set can be irrelevant. While there are many possible policies for choosing which iteration to roll back, in one embodiment, a component of the runtime system can be an arbitrator, which can roll back the iteration that detected the conflict. However, if other policies are needed, the arbitrator can be replaced with another component that implements the desired policy.

When iterating over an ordered set the arbitration policy described herein raises the possibility of deadlock: if iteration A and B conflict and the higher priority iteration, A, is rolled back, B still cannot commit (as that will break sequential semantics). Unfortunately, when A re-executes, it will still conflict with B and the default arbitrator will roll back A again. Thus, no forward progress will be made, and the system will deadlock.

Thus, when iteration i1 calls a method on a shared object and a conflict is detected with iteration i2, the arbitrator arbitrates based on the priorities of the two iterations. If i1 has lower priority, the thread executing i1 can perform standard rollback operations. The thread which was executing i1 can then begin a new iteration.

This situation can be complicated when i2 is the iteration that is rolled back. Because the runtime systems can function at the user level, there is no simple way to abort an iteration running on another thread. To address this problem, each iteration record can have an iteration lock as shown in FIG. 8 which is an illustration of a simplified non-limiting example of an iteration record maintained by the runtime system.

When invoking methods on shared objects, each thread can own the iteration lock in its record. Thus, the thread running i1 can perform the following:

1. The thread running i1 can attempt to obtain i2's iteration lock. By doing so, it ensures that i2 is not modifying any shared state.
2. The thread running i1 can abort i2 by executing i2's undo log and clearing the various conflict logs of i2's invocations. Note that the control flow of the thread executing i2 does not change; that thread continues as if no rollback is occurring.
3. The thread running i1 can set the status of i2 to ABORTED.
4. The thread running i1 can then resume its execution of i1, which can now proceed as the conflict has been resolved.

On the other side of this arbitration process, the thread executing i2 can realize that i2 has been aborted when the thread attempts to invoke another method on a shared object (or attempts to commit). At this point, the thread can see that i2's status is ABORTED and can cease execution of i2 and begin a new iteration.

By way of example, when an iteration has to be aborted, the callbacks in its undo log can be executed in LIFO order.

In one embodiment, a component of the runtime system can be a commit pool which can maintain the sequential semantics of user code by ordering the iterations being committed. The commit pool can do so in a manner similar to a reorder buffer in an out-of-order execution processor. When pulling iterations from an ordered set iterator, a scheduler can be given freedom to execute iterations in any order, and even to complete in any order (and hence a lower priority iteration can execute completely even while a higher priority iteration is still running). However, the commit pool can ensure that iterations commit their state (at which point no other iterations will trigger commutativity conflicts with them) in order.

The commit pool can contain a queue, called the commit queue which can be a list of all iterations current in the RUNNING, ABORTED or RTC states, sorted by priority. In one embodiment, the highest priority RUNNING iteration can be at the head of the queue.

When an iteration attempts to commit, the commit pool can check that the iteration is at the head of the commit queue, and that the priority of the iteration is higher than all the elements left in the set being iterated over. If both conditions are met, the iteration can successfully commit. If the conditions are not met, the iteration can wait until it has the highest priority in the system; the iteration's status can be set to RTC, and the thread can be allowed to begin another iteration.

When an iteration successfully commits, the thread that was running the iteration can check the commit queue to determine if more iterations in the RTC state can be committed. This can be performed by scanning forward through the commit queue. If so, the thread can commit those iterations before beginning the execution of a new iteration. When an iteration has to be aborted, the status of its record can be changed to ABORTED, but the commit pool takes no further action. Such iteration objects can be removed from the commit queue when they reach the head.

In one embodiment, a conflict log can be the object which performs commutativity checks. While there are many methods for implementing commutativity checks, some objects may have semantics which lend themselves to more efficient implementations than others, one example of an implementation is described herein. An implementation for the conflict log of an object can be a list comprising method signatures (including the values of the input and output parameters) of the invocations on that object made by currently executing iterations (called "outstanding invocations"). When iteration i attempts to call a method m1 on an object, the method signature can be compared against the outstanding invocations in the conflict log. If one of the entries in the log does not commute with m1, then a commutativity conflict can be detected, and an arbitration process can be performed to determine which iterations should be aborted. If m1 commutes with all the entries in the log, the signature of m1 can be appended to the log. When i either aborts or commits, all the entries in the conflict log inserted by i can be removed from the conflict log.

Each iteration can cache its own portion of the conflict logs in a private log referred to as a local log, as shown in FIG. 8. This local log can store a record of the methods the iteration has successfully invoked on the object. When an iteration makes a call, it first checks its local log. If the local log indicates that the invocation will succeed (either because that same method has been called before or other methods, whose commutativity implies that the current method also commutes, have been called before), the iteration does not need to check the object's conflict log.

Figure 10:
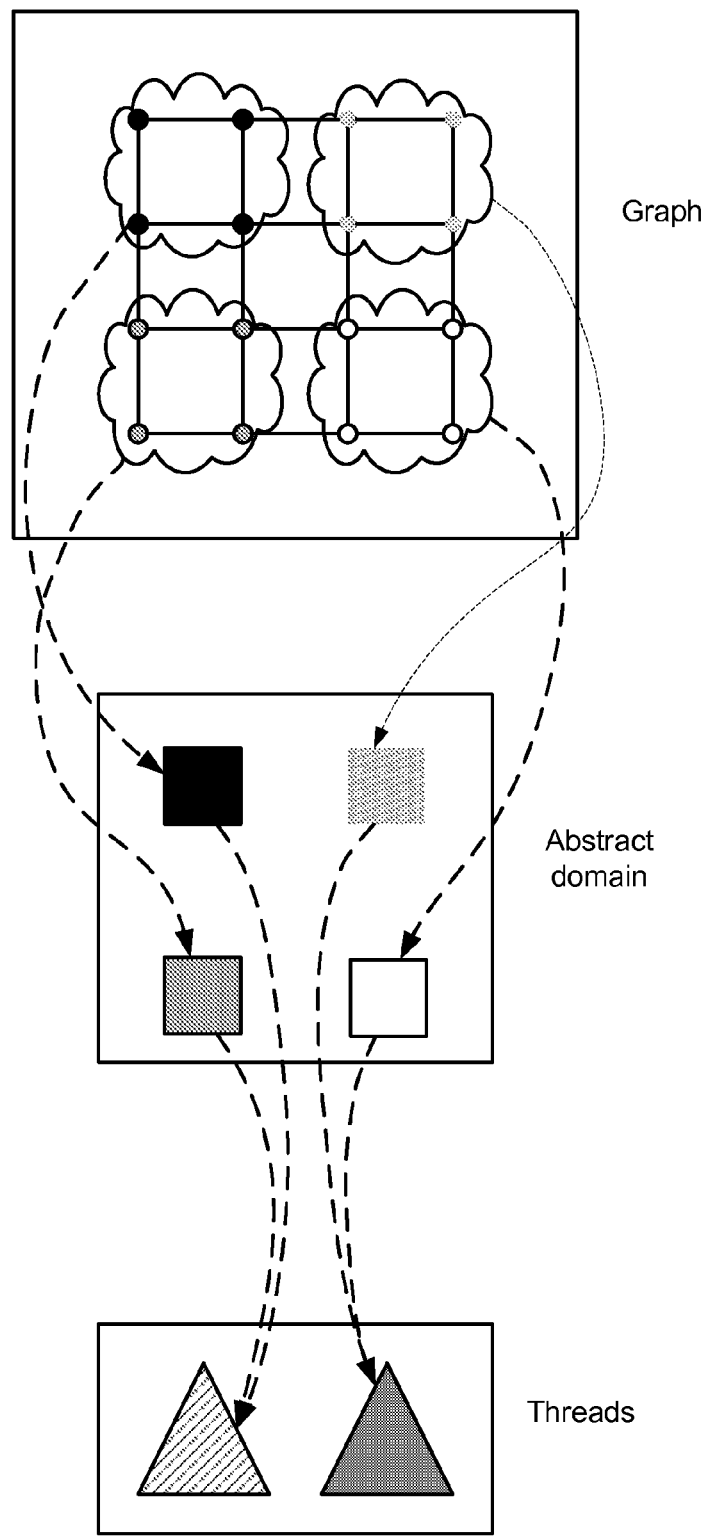
FIG. 10 illustrates a simplified, non-limiting graphical example of Data partitioning in the system.

FIG. 10 illustrates a simplified non-limiting example of how data-structure partitioning works. In FIG. 10, the data structure is a regular grid. By way of example, partitioning the grid can be performed in two stages: the nodes of the grid can be mapped to abstract processors in an abstract domain, and then the abstract domain can be mapped to the actual threads.

The use of abstract domains can simplify the implementation of over-decomposition. Over-decomposition can partition data-structures into more partitions than the number of threads, so that multiple partitions are mapped to each thread. For example, in FIG. 10, there are four partitions, each of which can be mapped to one abstract processor, and each thread has two abstract processors mapped to it.

Over-decomposition can be the basis for several mechanisms such as work-stealing and multi-threading. Work-stealing can be an implementation of dynamic load-balancing in which idle threads are allowed to steal work from overloaded threads. To promote locality of reference, work can be packaged together with its associated data, and can be moved when the work is stolen. Over-decomposition enables this to be implemented as a remapping of abstract processors to threads, simplifying the implementation. Over-decomposition can also enable an optimization in the system called lock coarsening.

In one embodiment, an abstract domain can be a set of abstract processors, which can be related by some topology (e.g., a grid or a tree). Abstract domains can be implemented as objects in the system, which expose a distribute method that can take as an argument, the number of threads that the abstract processors should be mapped to. Invoking the distribute method can assign abstract processors to threads.

In discussing data structure partitioning, it can be useful to distinguish between two kinds of data partitioning referred to as logical partitioning and physical partitioning.

In logical partitioning, data structure elements can be mapped to abstract processors, but the data structure itself can be a single entity that is not partitioned in any way. Logical partitioning can be implemented by using an extra field in each data structure element to record the identity of the abstract processor that owns that element, as is shown graphically in FIG. 10.

Logical partitioning can be useful for many problems—for example, it can be used to perform data-centric scheduling of iterations in Delaunay mesh refinement. When a thread accesses the work-set to retrieve a bad triangle to process, the scheduler can examine the work-set and return a bad triangle mapped to that thread. If mesh partitions are contiguous regions of the mesh, threads can end up working mostly in their own partitions, improving locality and reducing synchronization.

In one embodiment, to reduce the contention for shared data structures, physical partitioning can re-implement each partitioned object as a separate data structure that can be accessed independently of other partitions. For example, in Delaunay mesh refinement, a global work-set of bad triangles can be modified by all threads, creating contention. However, if this data structure is partitioned, each thread can manipulate its own portion of the global work-set without interference from other threads. Note that while the underlying implementation of the work-set changes, the interface to the work-set remains the same. From the perspective of user code, the work-set is still a single object, and the user code accessing it does not have to change. The "root" of the partitioned object is read-only and can be cached at all the threads, reducing contention. Note that physical partitioning in the system is not the same as the data structure partitioning that can be performed in distributed memory programming. In the latter case, the data structure can be fully partitioned and a processor cannot directly access data assigned to other processors.

In another embodiment, the class library can provide a simple irregular graph partitioner based on breadth-first graph traversal starting from a boundary node of the graph. These partitioners can be overridden by an application programmer if necessary. In yet another embodiment, boundary information for a data structure's partitions can be cached. For example, graph nodes that are adjacent to nodes assigned to another thread can be labeled as boundary nodes. This can be implemented by adding an extra field in each data structure element to record this value, which can be set when the data structure is partitioned.

In another embodiment, the assignment of work to threads can be data-centric. When the system starts up, it can spawn a thread for each core. In Java, for example, a virtual machine can map these threads to kernel threads, which the OS can then map to physical cores. Threads spawned by the system rarely sleep until the parallel execution is complete. Hence each thread can be effectively "bound" to a specific core.

During parallel execution of an optimistic iterator, the scheduler in a runtime system can assign work to threads dynamically while maintaining partition-sensitivity. If the set being iterated over is not partitioned, a scheduler can return a random element from the set. Otherwise, the scheduler can return an element that is mapped to that thread. Thus, work-set elements mapped to a given abstract processor can be worked on by a single thread. Furthermore, because other data structures in the system can be mapped to the same abstract processor, making the scheduler partition-aware can lead to locality benefits for other structures as well. For example, in Delaunay mesh generation, this data-centric scheduling policy can ensure that different threads work on triangles from different partitions of the mesh, reducing data contention and the likelihood of speculation conflicts.

A source of overhead in the system can be the time spent in performing commutativity checks. For example there are two issues: (i) the code for commutativity checks can be complex and (relatively) expensive; and (ii) even if the data structure is partitioned, the conflict logs are not partitioned and thus can become a bottleneck when multiple iterations concurrently access the structure. Data partitioning enables a new optimization referred to as lock coarsening, which can address this problem.

When a data structure is partitioned, commutativity checks can be replaced by locking entire partitions and using twophase locking. A lock can be associated with each abstract processor in the abstract domain. A thread can acquire locks on relevant partitions before accessing any elements mapped to these partitions. If any of those locks are already held by other iterations, a conflict can be detected and the runtime system can roll back an iteration. All locks can be held until the iteration completes or aborts.

In an embodiment, a plurality of optimizations can be implemented to improve the performance of the locking scheme. Locks on data-structure partitions can be cached by the iteration that holds them. If an iteration accesses multiple elements of a data structure and all the elements are in the same partition, the lock can be acquired only once. This process is referred to as lock caching.

If boundary information is provided by a data structure, several of the lock acquires can be elided. If an element x accessed by a method is not marked as a boundary element, the only way x could have been reached is if the iteration had already accessed the partition that that element is part of. Hence, the iteration does not need to acquire the lock on that partition. Thus the system attempts to acquire locks only when accessing boundary objects.

Lock coarsening can replace commutativity checks with simple lock acquires and releases, which can reduce overhead. Furthermore, by using locks to detect conflicts, the burden of conflict checking is no longer centralized in a single conflict log, eliminating a significant concurrency bottleneck. When lock coarsening can be combined with two optimizations (lock caching and synchronization on boundaries), while an iteration is working on elements in a single partition, no synchronization is required beyond acquiring the lock on that partition. Synchronization instead can occur when an iteration crosses partition boundaries. In many problems, boundary size can grow sub-linearly with data structure size (e.g., in a planar graph, boundary size grows as the square root of graph size), and hence synchronization overheads can decrease as problem size increases.

The methods and systems described can rely on a separation of concerns between writing algorithm code comprising the unordered-set and ordered-set iterators; writing the class libraries which comprise the commutativity, inverse and partitioning information; and writing the runtime system which permits the exploitation of amorphous data parallelism to achieve its flexibility and usability.

The runtime system, responsible for parallelization, can be provided as a general layer for all programs to build upon. The runtime system can be linked with a library by any applicable program. While the runtime system can be open to modification (allowing components such as the scheduler or arbitrator to be replaced), it can typically remain unchanged.

Library classes can define the semantics of data structures. Classes can be re-used in a modular fashion. In one embodiment, the classes can provide implementations of common data structures. However, more classes can provide more implementations as necessary.

User code can be written by programmers who may not have any familiarity with parallel programming. As such, the requirements for these programmers are minimal: the programmers must be able to identify portions of their algorithm that exhibit amorphous data parallelism; if possible, they should express any ordering constraints on their set iterators; and they can use library classes as the implementations of their data structures.

Figure 11:
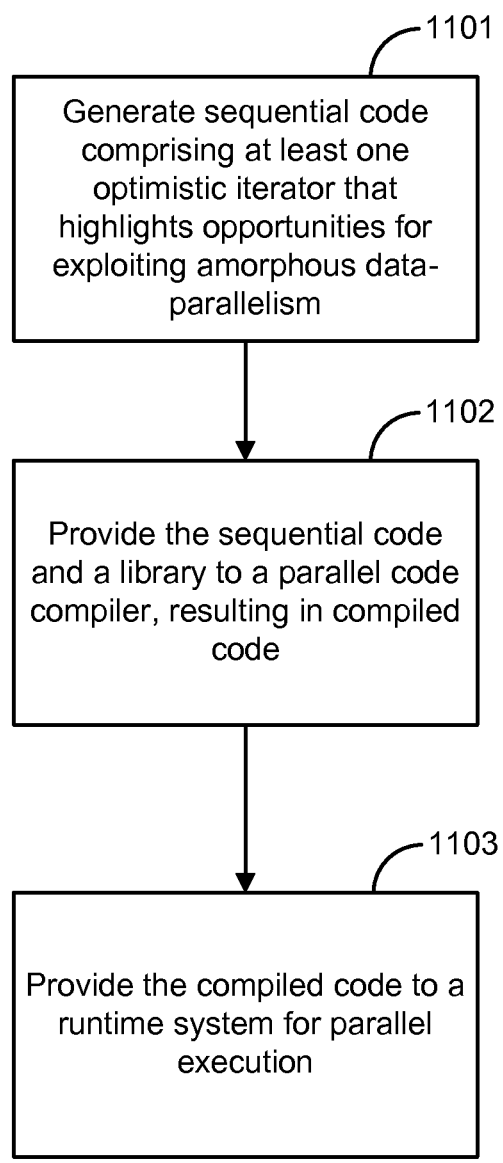
FIG. 11 illustrates an exemplary method.

In an aspect, illustrated in FIG. 11, provided are methods for automatically exploiting amorphous data-parallelism in computer programs, comprising generating sequential code comprising at least one optimistic iterator that highlights opportunities for exploiting amorphous data-parallelism at 1101, providing the sequential code and a library to a parallel code compiler, resulting in compiled code at 1102, and providing the compiled code to a runtime system for parallel execution at 1103.

The optimistic iterator can comprise an enumeration of work-set elements that permits additional work-set elements to be added to work-set during enumeration and an order constraint on the enumeration that is one of, one order only, no order, or partial order.

The library code can comprise atomicity properties for a plurality of methods, commutativity properties for the plurality of methods, undo procedures for the plurality of methods, and locality properties for the plurality of methods. The atomicity properties for the plurality of methods can comprise acquiring locks on objects before method invocation and releasing the locks upon return from method invocation. The commutativity properties for the plurality of methods can comprise a list of pairs of methods and the conditions under which the methods in each pair commute. The undo procedures for the plurality of methods can comprise specifying for each method, a second method which reverses the effects of the first method. The locality properties for the plurality of methods can comprise partitioning of the objects into multiple logical partitions and specifying for each method, a programmatic way of determining which logical partitions the method accesses.

Figure 12:
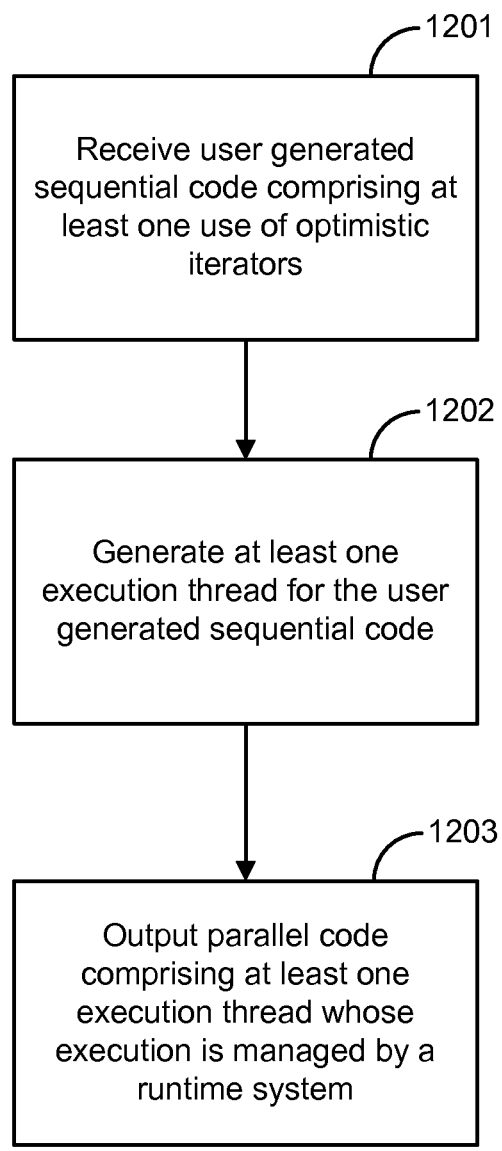
FIG. 12 illustrates another exemplary method.

In an aspect, illustrated in FIG. 12, provided are methods for automatic parallelization, comprising receiving user generated sequential code comprising at least one use of optimistic iterators at 1201, generating at least one execution thread for the user generated sequential code at 1202, and outputting parallel code comprising at least one execution thread whose execution is managed by a runtime system at 1203.

The optimistic iterator can comprise an enumeration of work-set elements that permits additional work-set elements to be added to work-set during enumeration and an order constraint on the enumeration that is one of, one order only, no order, or partial order. The runtime system can comprise assigning work to an execution thread according to locality data provided by a programming library, generating conflict logs according to commutativity data provided by the programming library, arbitrating conflicts between execution threads, and committing work performed by execution threads according to the order constraint specified by the optimistic iterator.

The programming library can comprise atomicity properties for a plurality of methods, commutativity properties for the plurality of methods, undo procedures for the plurality of methods, and locality properties for the plurality of methods. The atomicity properties for the plurality of methods can comprise acquiring locks on objects before method invocation and releasing the locks upon return from method invocation. The commutativity properties for the plurality of methods can comprise a list of pairs of methods and the conditions under which the methods in each pair commute. The undo procedures for the plurality of methods can comprise specifying for each method, a second method which reverses the effects of the first method. The locality properties for the plurality of methods can comprise partitioning of the objects into multiple logical partitions and specifying for each method, a programmatic way of determining which logical partitions the method accesses.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as examples only, with a true scope and spirit being indicated by the following claims.

What is claimed is:

1. A method for automatically exploiting amorphous data-parallelism in computer programs, comprising:
   generating sequential code comprising at least one optimistic iterator that highlights opportunities for exploiting amorphous data-parallelism;
   wherein the optimistic iterator comprises:
   an enumeration of work-set elements that permits additional work-set elements to be added to work-set during enumeration; and
   an order constraint on the enumeration that is one of, one order only, no order, or partial order;
   providing the sequential code and a library to a parallel code compiler, resulting in compiled code, wherein the library comprises user specified properties,
   and wherein the user specified properties comprises atomicity properties for a plurality of methods, commutativity properties for the plurality of methods, undo procedures for the plurality of methods, and locality properties for the plurality of methods,
   and wherein the locality properties for the plurality of methods comprise partitioning of objects into multiple logical partitions and specifying for each method a programmatic way of determining which logical partitions the plurality of methods access;
   providing the compiled code to a runtime system for parallel execution,
   wherein the runtime system is configured to evaluate, at run-time, commutativity of at least two iterations of the at least one optimistic iterator based on the commutativity properties.

2. The method of claim 1, wherein the atomicity properties for the plurality of methods comprise acquiring locks on objects before method invocation and releasing the locks upon return from method invocation.

3. The method of claim 1, wherein the commutativity properties for the plurality of methods comprise a list of pairs of methods and the conditions under which the methods in each pair commute.

4. The method of claim 1, wherein the undo procedures for the plurality of methods comprise specifying for each method, a second method which reverses the effects of the first method.

5. A method for automatic parallelization, comprising:
   receiving user generated sequential code comprising at least one use of optimistic iterators;
   wherein the optimistic iterator comprises:
   an enumeration of work-set elements that permits additional work-set elements to be added to work-set during enumeration; and
   an order constraint on the enumeration that is one of, one order only, no order, or partial order;
   receiving a library comprising user specified properties for a plurality of methods, and wherein the user specified properties comprise commutativity properties for the plurality of methods;
   generating at least one execution thread for the user generated sequential code;
   and outputting parallel code comprising at least one execution thread whose execution is managed by a runtime system, wherein the runtime system is configured to evaluate, at run-time, commutativity properties of at least two iterations of the at least one optimistic iterators based on the commutativity properties.

6. The method of claim 5, wherein the runtime system comprises:
   generating conflict logs according to commutativity data provided by the programming library;
   arbitrating conflicts between execution threads;
   and committing work performed by execution threads according to the order constraint specified by the optimistic iterator.

7. A computer readable non-transitory medium having computer-executable instructions embodied thereon for automatically exploiting amorphous data-parallelism in computer programs, comprising:
   generating sequential code comprising at least one optimistic iterator that highlights opportunities for exploiting amorphous data-parallelism;
   wherein the at least one optimistic iterator comprises an enumeration of work set elements that permits additional work set elements to be added to work set during enumeration and
   an order constraint on the enumeration that is one of, one order only, no order, or partial order;
   providing the sequential code and a library to a parallel code compiler, resulting in compiled code,
   wherein the library comprises user specified properties for a plurality of methods, and wherein the user specified properties comprise atomicity properties for a plurality of methods, commutativity properties for the plurality of methods, undo procedures for the plurality of methods, and locality properties for the plurality of methods,
   wherein the locality properties for the plurality of methods comprise partitioning of objects into multiple logical partitions and specifying for each method a programmatic way of determining which logical partitions the plurality of methods access;
   and providing the compiled code to a runtime system for parallel execution, wherein the runtime system is configured to evaluate, at run-time, commutativity of at least two iterations of the at least one optimistic iterator based on the commutativity properties.

8. The computer readable medium of claim 7, wherein the atomicity properties for the plurality of methods comprise acquiring locks on objects before method invocation and releasing the locks upon return from method invocation.

9. The computer readable medium of claim 8, wherein the commutativity properties for the plurality of methods comprise a list of pairs of methods and the conditions under which the methods in each pair commute.

10. The computer readable medium of claim 7, wherein the undo procedures for the plurality of methods comprise specifying for each method, a second method which reverses the effects of the first method.

11. A computer readable non-transitory medium for automatic parallelization, comprising:
 receiving user generated sequential code comprising at least one use of optimistic iterators,
 wherein the optimistic iterators comprise an enumeration of work set elements that permits additional work set elements to be added to work set during enumeration and an order constraint on the enumeration that is one of, one order only, no order, or partial order;
 receiving a library comprising user specified properties for a plurality of methods, and wherein the user specified properties comprise commutativity properties for the plurality of methods;
 generating at least one execution thread for the user generated sequential code;
 and outputting parallel code comprising at least one execution thread whose execution is managed by the runtime system, wherein the runtime system is configured to evaluate, at run-time, commutativity of at least two iterations of the at least one optimistic iterator based on the commutativity properties.

12. The computer readable medium of claim 11, wherein the runtime system comprises:
 generating conflict logs according to commutativity data provided by the programming library;
 arbitrating conflicts between execution threads;
 and committing work performed by execution threads according to the order constraint specified by the optimistic iterator.

13. The method of claim 1, wherein the logical partitions comprise a mapping of data structure elements to abstract processors.

14. The method of claim 13, wherein the mapping of the data structure elements to the abstract processors comprises recording the identity of the abstract processor mapped to a data structure element in a field in the data structure element.

* * * * *